(12) United States Patent
Gaurav et al.

(10) Patent No.: US 12,229,705 B2
(45) Date of Patent: Feb. 18, 2025

(54) UNIFIED SYSTEM TO RETRIEVE AND DISPLAY LAW FIRM ANALYTIC DATA IN RESPONSE TO NATURAL LANGUAGE QUERIES

(71) Applicant: Perkins Coie LLP, Seattle, WA (US)

(72) Inventors: Kumar Gaurav, Kirkland, WA (US); Chris Swarthout, Mountlake Terrace, WA (US); Trevor Varnes, Mercer Island, WA (US); Koushik Subramananian, Tampa, FL (US)

(73) Assignee: Perkins Coie LLP, Seattle, WA (US)

(*) Notice: Subject to any disclaimer, the term of this patent is extended or adjusted under 35 U.S.C. 154(b) by 437 days.

(21) Appl. No.: 17/522,323

(22) Filed: Nov. 9, 2021

(65) Prior Publication Data

US 2022/0147898 A1 May 12, 2022

Related U.S. Application Data

(60) Provisional application No. 63/111,423, filed on Nov. 9, 2020.

(51) Int. Cl.
*G06Q 10/0639* (2023.01)
*G06F 3/04817* (2022.01)
*G06F 16/9535* (2019.01)
*G06F 21/62* (2013.01)
*G06Q 50/18* (2012.01)
*G06F 3/0482* (2013.01)

(52) U.S. Cl.
CPC ... *G06Q 10/06393* (2013.01); *G06F 3/04817* (2013.01); *G06F 16/9535* (2019.01); *G06F 21/6218* (2013.01); *G06Q 50/18* (2013.01); *G06F 3/0482* (2013.01)

(58) Field of Classification Search
CPC ............ G06Q 50/18; G06Q 10/06393; G06F 21/6218; G06F 3/04817; G06F 16/9535
See application file for complete search history.

(56) References Cited

U.S. PATENT DOCUMENTS

| | | | |
|---|---|---|---|
| 10,402,419 B1 * | 9/2019 | Rubinstein | G06F 16/24575 |
| 2008/0052291 A1 * | 2/2008 | Bender | G06F 21/6227 707/999.009 |
| 2011/0112891 A1 * | 5/2011 | Alber | G06Q 10/06398 707/723 |
| 2016/0224194 A1 * | 8/2016 | Pacalin | G06Q 10/06 |

(Continued)

OTHER PUBLICATIONS

Natural Language Querying of Complex Business Intelligence Queries; Sen et al.; 2019 (Year: 2019).*

*Primary Examiner* — Deirdre D Hatcher
(74) *Attorney, Agent, or Firm* — Perkins Coie LLP

(57) ABSTRACT

A system and methods are described for retrieving, displaying, and/or analyzing law firm analytic data in response to natural language queries. The system, at an interface or bot, receives queries as plaintext messages requesting information about or maintained by a law firm. The system generates intent scores for the message for each of multiple intents and determines an intent for the message based on a highest generated score exceeding a threshold. The system extracts entities from the message, applies an algorithm to the determined intent and extracted entities, and identifies a data source from which to retrieve information. The system then retrieves and displays information from the identified data source.

14 Claims, 15 Drawing Sheets

(56) References Cited

U.S. PATENT DOCUMENTS

| | | | |
|---|---|---|---|
| 2016/0232537 A1* | 8/2016 | Nonez | G06F 16/24578 |
| 2016/0267128 A1* | 9/2016 | Dumoulin | G06F 16/3329 |
| 2016/0314146 A1* | 10/2016 | Carothers | G06F 16/38 |
| 2018/0060422 A1* | 3/2018 | Wegryn | G06F 40/295 |
| 2018/0113718 A1* | 4/2018 | Bhamidipati | G06Q 10/103 |
| 2019/0354544 A1* | 11/2019 | Hertz | G06N 5/025 |
| 2020/0012745 A1* | 1/2020 | Bain | H04L 9/0822 |
| 2020/0073984 A1* | 3/2020 | Sen | G06F 16/243 |
| 2020/0142959 A1* | 5/2020 | Mallinar | G06N 20/20 |
| 2020/0258511 A1* | 8/2020 | Barkol | G06F 40/30 |
| 2020/0302936 A1* | 9/2020 | Abu Asba | G10L 15/30 |
| 2020/0394190 A1* | 12/2020 | Chaudhuri | G06F 16/243 |
| 2021/0209168 A1* | 7/2021 | Oswald | G06F 40/47 |
| 2022/0292092 A1* | 9/2022 | Brown | G06F 16/2471 |

\* cited by examiner

Top 10 clients in the firm?

Just now

534

As of June 27 2020 9:14PM Top 10 clients for transactions between 05/28/2020 through 06/27/2020:

1. GHI Ltd. – 905307  Billing:$5,207,592.
2. Grapes Incorporated – 164606  Billing:$4,211,012.
3. The Bears Company – 920536  Billing:$3,456,718.
4. Green Goats Inc. – 631671  Billing:$2,666,543.
5. New Orange Limited – 767543  Billing:$2,655,342.
6. Franklin Co. – 887543  Billing:$2,546,119.
7. Old Country LLC – 898345  Billing:$1,986,876.
8. Amigo Atlantic – 765234  Billing:$1,741,930.
9. Sour Pickle Limited – 323878  Billing:$1,481,089.
10. Frankly Cucumber LLC – 108638  Billing:$1,218,980.

Just now

Type your message

*FIG. 5E*

UNIFIED SYSTEM TO RETRIEVE AND DISPLAY LAW FIRM ANALYTIC DATA IN RESPONSE TO NATURAL LANGUAGE QUERIES

BACKGROUND

Modern law firms generate large amounts of data. Law firm data may relate to, for example, clients, attorneys, practice groups and subgroups, office locations, and so forth. Law firms rely on this data for practice management, attorney and staff evaluations, client relations, marketing, business development, financial planning, and other purposes. For example, an attorney may consult timekeeping data to plan his or her schedule based on billable hour goals. Finance staff may consult billing and collections information to follow up with clients about payment or to gauge firm performance. Managers, executives, and committees may consult data about the firm or specific practices or offices to make decisions about budgeting, hiring, and so forth.

But existing law firm data systems are decentralized and inefficient. For example, firm data may be scattered across separate systems, databases, or physical storage facilities. To access this scattered data, attorneys may need to learn about and access multiple software systems. These efforts take up time that would be better spent serving clients. And firms lack access to comprehensive, real-time data (e.g., hourly or up-to-the-minute data). Law firms, therefore, may not be able to take full advantage of the data that they generate and maintain because the data is not readily available in a manner that is timely and centralized.

Because of these and other shortcomings of existing technologies, law firms need a system for centralized, efficient, and up-to-the-minute access to firm data across multiple domains and systems.

The need exists for a system that overcomes the above problems, as well as one that provides additional benefits. Overall, the examples herein of some prior or related systems and any associated limitations are intended to be illustrative and not exclusive. Other limitations of existing or prior systems will become apparent to those of skill in the art upon reading the following Detailed Description.

BRIEF DESCRIPTION OF THE DRAWINGS

FIGS. 5A-5J illustrate a user interface for interacting with a unified system to retrieve and display law firm analytic data in response to natural language queries.

DETAILED DESCRIPTION

Overview

Figure 1:
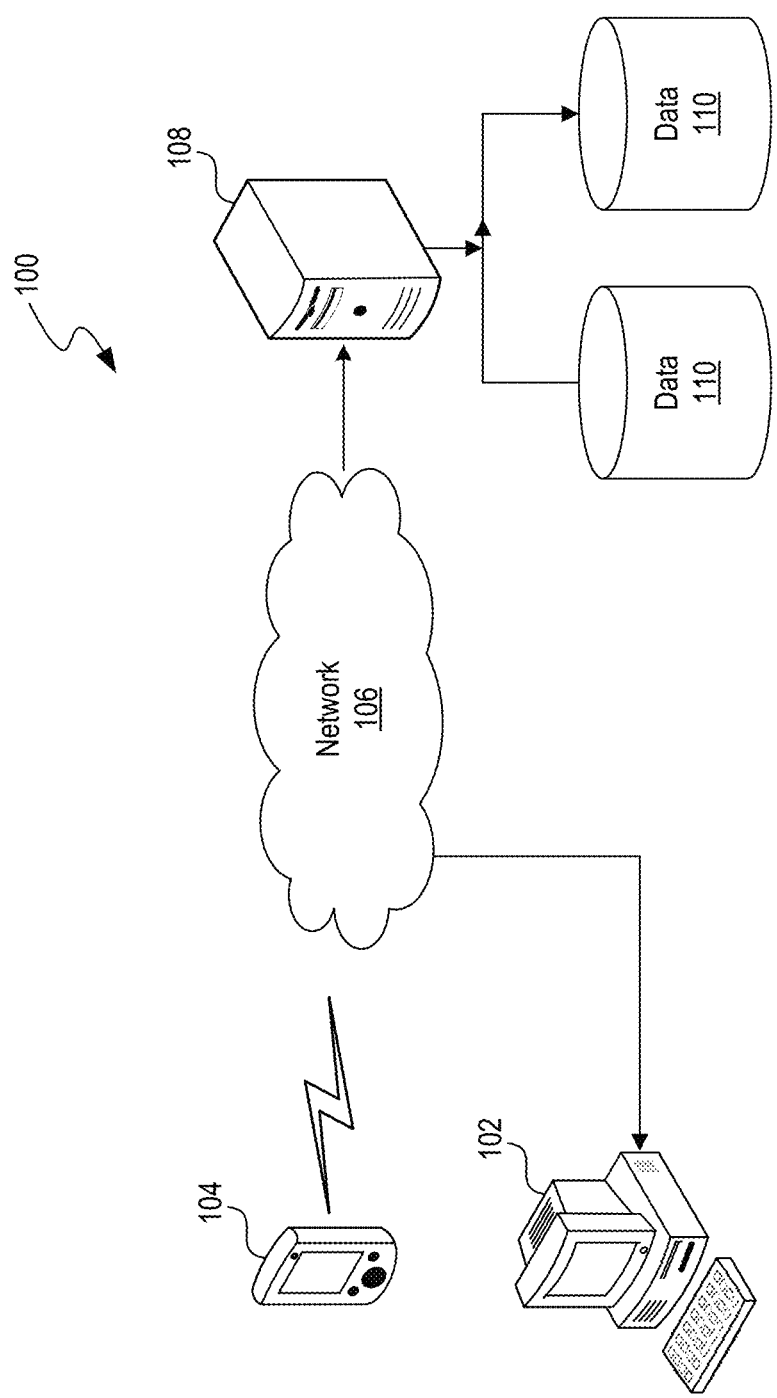
FIG. 1 is a block diagram of an environment in which a unified system to retrieve and display law firm analytic data in response to natural language queries operates.

This specification describes a unified system and methods for retrieving and displaying law firm analytic data in response to natural language queries (the "system"). The system simplifies and centralizes processes for locating and retrieving law firm data from multiple sources (e.g., combining multiple systems). The system can also automate processes for granting or denying access to law firm data. Additionally, the system provides customized tools to facilitate analysis of retrieved data, such as functional interfaces, charts, graphs, recommendations, dashboards, reports, and so forth.

Various examples of the invention will now be described. The following description provides certain specific details for a thorough understanding and enabling description of these examples. One skilled in the relevant technology will understand, however, that the invention can be practiced without many of these details. Likewise, one skilled in the relevant technology will also understand that the invention can include many other obvious features not described in detail herein. Additionally, some well-known structures or functions may not be shown or described in detail below to avoid unnecessarily obscuring the relevant descriptions of the various examples. Further, the examples in this application of prior or related systems and their associated limitations are intended to be illustrative and not exclusive. Other limitations of existing or prior systems will become apparent to persons of ordinary skill in the art upon reading the following description.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The system described in detail herein receives queries as natural language plaintext messages representing requests for law firm information that may be stored in multiple data storage areas (e.g., on different servers, in different databases, generated from different applications or systems, etc.). The system receives messages via a chat window, virtual bot, graphical user interface (GUI), chat bot, website, or interface. Messages can be received, for example, as plaintext messages or as voice messages that are converted to plaintext messages. The messages represent requests for retrieval, display, and/or analysis of requested information about or maintained by a law firm.

Information requested in a message can be any information about or maintained by a law firm. For example, a request can relate to an attorney or other employee in the firm, such as information about human resources, billing rates, client and matter assignments, timekeeping information (e.g., hours recorded, hours billed, hours collected, etc.), origination information, amounts billed, amounts collected, and so forth. Similarly, requested information can relate to specific legal practice groups (e.g. litigation, business, regulatory, intellectual property), subgroups (e.g. antitrust, bankruptcy, patent litigation, patent prosecution), or geographic offices within a law firm (e.g. Seattle, Shanghai, San Diego). A request can also seek information about clients or matters of the firm, such as amounts billed to specific clients or specific matters for those clients, hours worked in relation to clients or matters, accounts maintained for clients or matters (e.g., money held in trust accounts for certain clients), attorneys or staff assigned to clients and matters, and so forth. A request can also seek information about law firm billing or financial information, such as copies of invoices from a client invoicing database, overall firm performance information (e.g., revenues, expenses, accounts payable and receivable, etc.), and so forth. In addition, the request can be for retrieval of documents or information from a client document management database.

A received message can also request various calculated metrics (e.g., rates, averages, pace, etc.) or comparative analyses of information. For example, the system can automatically return above-the-line (ATL, which can refer to gross financial data) or below-the-line (BTL) analyses of retrieved financial information, such as up-to-the-minute statistics for a present year compared to the same statistics in the prior year. The system can also generate various summary reports, such as statistic sheets for clients, attorneys, employees, etc. for a defined time period with information about payments, compensation, time billed or recorded for various categories of activities, production rate information, business or matter origination information, and so forth. Calculated metrics and comparative analyses can include information from multiple data sources accessible by the system. In addition, the system can process retrieved information or provide various visual displays, such as graphs, charts, plots, or other visualizations.

Information requested in a message can facilitate planning, supervision, analysis, budgeting, and other functions within a law firm. For example, the system can provide unreleased hours for a client or matter and an estimated value for the unreleased hours. The system can provide the most recent time entries submitted by timekeepers working on a specific client or matter to help an attorney who is the lead for the client or matter to budget the hours and assist in giving real time information about upcoming bills. The system helps attorneys evaluate themselves and others by giving them information about partners with whom they have worked within a specified range (e.g., within a current statistical or fiscal year) and total number of hours worked (e.g., in response to a query of "Who has Anthony Jones worked with this year?"). The system can help supervising attorneys allocate work and evaluate others, for example, by showing what matters an attorney is working on and how much time the attorney is working on each matter (e.g., per week, per month, etc.). This information can be useful, for example, to show whether an attorney will be available to work on an upcoming case or matter. The system can also report attorney affiliations, such as in relation to committees or resource groups of the firm, bar admissions, client relationships, practice or industry groups, etc.

Upon receiving the message, the system analyzes the message to identify variables, such as key words or phrases, that can help the system determine a meaning for the message. For example, the system can employ fuzzy logic to recognize patterns of words in a query, e.g., based on one or more preselected words or grammatic structures (e.g., verbs and associated subjects, keywords or phrases, etc.). Alternatively or additionally, the system can interpret or infer meaning based on similarity/dissimilarity to one or more example utterances as well (e.g., based on scores or probabilities assessing similarity or dissimilarity a received message and an example utterance). These techniques can be separate from, but related to, determining an intent score, as described below. In some implementations, the system can use Microsoft's language understanding tool (LUIS) to identify words or phrases within a message that can be used to interpret a meaning of the message based on similarity to words or phrases in known or previous queries, proximity to other key words or phrases (e.g., a word or phrase immediately after the key word "client" can correspond to a variable that the system will interpret to be a likely client name), and so forth.

Based on analyzing the message, the system assesses an intent of or for the message. Intent represents the purpose of the message, such as the specific information that a user requests. To assess intent of a message, the system generates scores for each of multiple defined intents. The system stores example utterances corresponding to each of the defined intents. As used herein, the term "utterance" means typed, written, spoken or otherwise conveyed language provided by a user to be interpreted by a computer or other data processor. Utterances can be received or stored as text or converted to text such as by transcribing audio or through optical character recognition. To generate intent scores, the system compares the received message to example utterances corresponding to each defined intent. The generated scores represent a degree of similarity or dissimilarity between the received message and the example utterances for each defined intent, where a high score indicates greater similarity and a low score indicates greater dissimilarity. A relatively high intent score indicates a greater likelihood that the received message corresponds to the intent. If at least one generated score exceeds a threshold score then the system determines an intent for the message based on the highest generated score.

In some implementations, an intent can be a compound intent such that the intent of the message corresponds to two or more pieces of information or data sources, which can be from different domains or systems. For example, a compound intent can be defined for an inventory relating to a client, where inventory includes both accounts receivable (AR) and works in progress (WIP), which may each be associated with a different data source, domain, or system. If the system determines that a received query corresponds to this compound intent, the system then retrieves the multiple pieces of information sought by the query. Thus, the system can retrieve pieces of information from multiple data sources in response to a single query.

The system also extracts data entities from the received messages. Data entities represent pieces of information in the received message. As explained below, a data entity can be a word, phrase, number, and so forth.

Using the determined intent and the extracted entities, the system identifies one or more data sources from which to retrieve information in response to the received message. To identify the one or more data sources, the system applies an algorithm to the determined intent and the extracted entities, as described below.

Based on the determined intent and the extracted entities, the system retrieves information from the identified data source or sources and provides the retrieved information to a user. The system can provide the retrieved data in various formats and through various means, such as through a GUI, bot, chat window, and so forth, which may also include applying customized analytic tools to the retrieved data.

In some implementations, the system can also grant or deny access to information requested in a received message based on defined user classes or levels of access granted to users. The system can differentiate between different user classes or types that are granted different levels of access. For example, in a law firm, a partner or other supervisory attorney can have broad or unlimited access to information, such as to facilitate supervision of other attorneys. But other users, such as associate attorneys, paralegals, staff, or non-partner attorneys, can have more limited access, such as access that is limited only to information about the particular user or for a particular department, office, practice group or subgroup. For example, if attorney Bill asks for information about attorney Fred then the system can determine whether Bill is an authorized user to access information about other attorneys. If the system determines that Bill is authorized to access the requested information then the system provides the requested information, e.g., by retrieving and displaying the information. If the system determines that Bill is not authorized to access the requested information then the system denies access and displays a message indicating that access is denied. Thus, the system automates law firm processes for granting, denying, or restricting access to law firm data.

The system determines message intents based on artificial intelligence (AI) models. For example, the system trains and applies one or more AI models based on stored intents and corresponding example utterances. For an "attorney performance" intent, the system can store corresponding example utterances of "How is attorney Bill doing," "Hours billed by attorney Mary in March," "How are the patent litigation associates doing this month" and "How are the paralegals in the D.C. office doing this quarter." The system further stores indications of entities that can be extracted within these example utterances. Using an AI natural language processing model, the system then compares received messages with these example utterances and assesses the received messages for similarity or dissimilarity with the example utterances, such as related to grammatic structures or keywords. This comparison is used to generate intent scores based on degree of similarity or dissimilarity. For example, the system generates a relatively high "attorney performance" intent score for a received message of "How am I doing?" because the system recognizes the query to be similar to the example utterance "How is attorney Bill doing?" Table 1 below shows additional examples of associations between intents and utterances. And Table 1 further shows specific entities (e.g., data, strings, numbers, etc.) that are identified and extracted from the example utterance.

TABLE 1

| Example Utterance | Intent | Extracted Data |
| --- | --- | --- |
| How is commercial litigation doing? | GroupData | "commercial litigation" |
| Matters for XYZ Corp.? | ClientData | "matters" "XYZ Corp." |
| Seattle office collections this month? | GroupData | "Seattle" "collections" "this month" |
| How is the firm doing? | GroupData | "firm" |
| How is Bob doing? | TkprSelfData | "Bob" |
| How am I doing? | TkprSelfData | "I" |
| My hours since Jan. 1, 2020 | Production | "My" "Since Jan. 1, 2020" |
| Details on unbilled work for client XYZ in the month of August | InventoryWIP | "XYZ", "August" |

If the system is unable to determine an intent for a message (e.g., if no intent score exceeds a threshold, or the highest score is for "no intent") or if the system determines the wrong intent, the system can be trained. Training the system can include receiving an indication of a corrected intent and storing new example utterances. For example, a user may ask for a copy of a bill by submitting a message to the system of "bill for XYZ Corp. this week." If the system mistakenly associates the word "bill" with the name of a timekeeper "Bill." the system may determine an incorrect intent of "attorney performance" instead of, e.g., "client information" or "billing". In that case, the user or an administrator can provide an indication to the system that the determined intent is incorrect and select a corrected intent. The system can also store the received message as an example utterance corresponding to the corrected intent. Based on the selected corrected intent and the new stored example utterance, the system can increase the accuracy of determined intents for subsequently received messages.

A "model" (e.g., an AI model) as used herein, refers to a construct that is trained using training data to make predictions or provide probabilities for new data items, such as predicting a message intent for a new message, whether or not the new data items were included in the training data. For example, training data for supervised learning can include items with various parameters and an assigned classification. A new data item can have parameters that a model can use to assign a classification to the new data item. As another example, a model can be a probability distribution resulting from the analysis of training data, such as a likelihood of an n-gram occurring in a given language based on an analysis of a large corpus from that language. Examples of models include, without limitation: neural networks, support vector machines, decision trees, Parzen windows, Bayes, clustering, reinforcement learning, probability distributions, decision trees, decision tree forests, and others. Models can be configured for various situations, data types, sources, and output formats.

In some implementations, models trained by the system can include a neural network with multiple input nodes that receive training datasets. The input nodes can correspond to functions that receive the input and produce results. These results can be provided to one or more levels of intermediate nodes that each produce further results based on a combination of lower level node results. A weighting factor can be applied to the output of each node before the result is passed to the next layer node. At a final layer, ("the output layer,") one or more nodes can produce a value classifying the input that, once the model is trained, can be used to assess likely intents for a message, and so forth. In some implementations, such neural networks, known as deep neural networks, can have multiple layers of intermediate nodes with different configurations, can be a combination of models that receive different parts of the input and/or input from other parts of the deep neural network, or are convolutions—partially using output from previous iterations of applying the model as further input to produce results for the current input.

A model can be trained with supervised learning. Testing data can then be provided to the model to assess for accuracy. Testing data can be, for example, a portion of the training data (e.g., 10%) held back to use for evaluation of the model. Output from the model can be compared to the desired and/or expected output for the training data and, based on the comparison, the model can be modified, such as by changing weights between nodes of the neural network and/or parameters of the functions used at each node in the neural network (e.g., applying a loss function). Based on the results of the model evaluation, and after applying the described modifications, the model can then be retrained to evaluate new data (e.g., new message requests).

In some implementations, the system responds to received messages by retrieving answers from a predetermined question and answer set, such as by using Microsoft Azure QnA Maker tool. For example, the system can compare (e.g., using a trained AI model) a received message to a set of stored, predetermined questions that are associated with corresponding answers, as described above, based on similarity or dissimilarity to the questions or based on variables identified in the received message, such as key words or phrases. If the system determines that the received message is similar to one of the stored, predetermined questions, then the system retrieves the answer associated with the stored, predetermined question and provides the answer to the user, such as by displaying the answer via a GUI, bot, or other interface. In this example implementation, the system can respond to a received message without determining an intent for the received message, such as when the system is unable to determine an intent for a received message, or as an alternative to determining an intent for a received message.

In some implementations, the system can dynamically adapt display of a GUI, chatbot, or other interface or provide customized content for each user based on user preferences, settings, or inputs. Dynamic adaptations can be automatic (e.g., based on usage) or based on manual inputs from a user. As one example, the system can detect usage of a user and dynamically adapt display based on the user's usage, which can include aesthetic or functional aspects of the display. If, for example, the system detects that a user submits multiple queries relating to the user's hours (e.g., billable hours, pro bono hours, administrative hours, etc.), the system can cause to be displayed information to assist the user, such as related queries, available analyses of retrieved information, suggestions for actions that the user can take to meet billable hour goals, and so forth.

In another example, the system can suggest collaborations between a user and other attorneys or staff within the firm. For example, the system can determine a match between key words or phrases relating to a new matter that is associated with a user (e.g., an attorney) and corresponding key words or phrases relating to an existing matter that is associated with another user (e.g., another attorney of the firm). The key words or phrases can be, for example, uncommon words in a matter name or description, or associated with a client, topic, subject matter, area of law, area of technology, and so forth. If the system identifies a match between the new matter (e.g. related to 5G technology) and an existing matter (e.g. in the 5G field), the system can send an email to suggest a collaboration between the user associated with the new matter and the user associated with the existing matter. Alternatively, upon identifying a match, the system can display a message to the user that includes information about the existing matter or an attorney associated with the existing matter, and options for the user to initiate communication with the attorney associated with the existing matter. Communication can be initiated, for example, by sending an email, sending an instant message, automatically generating a meeting or appointment on a calendar for the user and the attorney to meet, and so forth. The system can associate users (e.g., attorneys) with particular matters, for example, based on stored data about matters and associated timekeepers or based on usage of a user (e.g., when a user submits multiple queries about a client, matter, topic, area of law, etc.). In addition to client matters, users can be associated with other stored data of the system, such as clients, practice groups, areas of law, industry groups, client contacts, and so forth.

In some implementations, the system can store saved queries. For example, the system can maintain and display a query history that allows a user to resubmit previous queries by selecting a saved query without having to retype the previous query. Additionally, the system can sort saved queries, such as by displaying saved queries in an order of preference (e.g., in order of most frequent to least frequent, chronologically, etc.). For example, if a user's most frequently submitted query is "My hours in 2021?" then, when the user accesses the system, the system can automatically display a first suggested query of "My hours in 2021?" The user can select the suggested query, such as by clicking, and the user is thus able to repeat a most frequent query without having to retype it.

In some implementations, the information returned by the system in response to a query is shareable, such that the user can transmit the response (e.g., by email, instant message, link, etc.). A user can share a response, for example, to receive the response in the user's email inbox, or send the response to another person. The system enables sharing within the GUI, bot, or other interface, such as by clicking a selectable button or icon, so that a user need not separately save the response (e.g., as a screenshot, file, etc.) and send it, e.g., as an email attachment. The shared content can be any output of the system, such as a document file, an image, a link to a web page, a link that causes the recipient to submit a query to the system, etc.

In some implementations, the system can respond to a query with visualizations of retrieved data, such as charts, graphs, plots, images, or other visual representations of retrieved information. For example, for a query of "How am I doing?" the system can automatically display a response that includes various statistics and visualizations of the statistics, such as graphs or charts that show pacing information, comparisons to prior years or months, comparisons to a goal, etc. One or more visualizations provided by the system can be directly in response to a user request (e.g., "bar graph of client billings in December 2021") and/or automatically generated without being specifically requested in a message (e.g., as a customized tool generated by the system to facilitate analysis of complex data, such as by emphasizing important data, trends in data, etc.).

In some implementations, the system can interpret queries and generate responses that include subjective content. For example, before the end of a fiscal or statistical year, a user can submit a query asking "What will the firm's profits per partner be this year?" Because the query is submitted before the end of the year, the system will have insufficient information to provide an objective response, i.e., because an objective response depends on uncertain future events. But the system can instead give a subjective response, for example, that accounts for year-to-date statistics, projections based on rate or pace information, statistics from prior years, or other information. The response to the query can include a prediction or other subjective statement (e.g., "It looks like profits per partner will likely be about $1.39 million this year.") and information about assumptions underlying the system's response (e.g., "Profits per partner were $1.2 million last year, and year-to-date gross revenue is up 16% compared to last year.").

Advantages of the system include improved ability to access real-time (e.g., hourly or up-to-the-minute) law firm data. For example, the system can retrieve information across multiple domains or systems of a law firm in real time; the decentralized nature of law firm data storage has previously made real-time retrieval of information prohibitive. In addition, the system provides access to data through a centralized portal instead of requiring attorneys and other users to provide different access credentials for different systems or data sources and learn different software systems to access different kinds of law firm information. As used herein, "real time" includes operations performed substantially without delay (e.g., one second or less, within seconds, within a minute, less than three minutes, etc.), such as retrieval and formatting of data from multiple systems or data sources that includes all current data entries (e.g., up-to-the-minute or up-to-the second data). The system, thus, reduces administrative burden and allows firms to allocate greater time to client service. In addition, the system performs operations that cannot be practically performed by humans, such as providing real-time or instant (e.g., within seconds) retrieval and display of law firm data stored across multiple domains or systems.

The foregoing advantages are achieved while also ensuring information security and maintaining confidentiality of information. Law firms maintain a variety of confidential information, such as information covered by attorney-client privilege or attorney work product protections, and information required to be maintained in confidence under applicable rules of professional responsibility. Therefore, the system manages access to information in accordance with applicable confidentiality requirements. For example, the system can authenticate a user by validating access credentials, such as by using Microsoft Azure Active Directory, to ensure that only authorized users can access the system. In addition to authenticating users, the system uses a security table to confirm that a user identifier associated with the user is indicated in the security table to be associated with an authorized user. And the system can use a row-level security model to restrict access to information such that authorized users can be restricted to only accessing approved data sources. In some implementations, the system applies the foregoing security measures and others based on one or more rules associated with conflicts of interest and/or screening of attorneys and staff associated with such rules. For example, the system can store and/or access one or more data structures (e.g., tables or databases) having information about screens that are in place that prohibit a user from accessing information about one or more clients or client matters. If a query submitted by such user would result in retrieval of information from which the user is screened, the system can instead return and display an error message informing the user that the user is prohibited from accessing information responsive to the query. Thus, the present system employs access control measures based on various factors, such as screening some attorneys, paralegals, or others from accessing any documents or data related to a client or matter that they may be ethically screened from accessing.

FIG. 1 is a block diagram of an environment in which a unified system to retrieve and display law firm analytic data in response to natural language queries operates. The environment 100 includes one or more client devices that may be used to access a user interface for the system, such as a GUI, chatbot, etc., as described herein. In particular, the environment 100 includes a computer 102 and a mobile device 104, which may access the described system using an application or by accessing web pages. To access the system, a user can use any client device capable of accessing applications or web pages, such as a tablet computer, desktop computer, smartphone, phablet, laptop, wearable device, etc. During operation, a user interacts with an interface of the system on the computer 102 or the mobile device 104 to provide input to the system, such as by submitting queries in the form of plaintext messages. The interface may store the input locally or transmit it for input to a server 108 via a network 106. The network 106 may be a Local Area Network (LAN) using, for example, Ethernet or IEEE 802.11 wireless LAN technology, or a Wide Area Network, such as the Internet. The server 108 is connected to one or more data storage areas 110, which are configured to store law firm data. The data storage areas 110 may be implemented as flat storage or may use database software, such as Microsoft SQL Server, provided by Microsoft Corporation of Redmond, Washington. In some implementations, the system can be a hybrid system including both local and cloud-based features, such as data storage areas 110 that are on-premises and accessed using a cloud-based gateway, API, or other component via the network 106. For example, data accessed or retrieved by the system can be stored on-premises, while other functions of the system (e.g., intent scoring) can be performed on the cloud. In some implementations the system can also access external information, such as by accessing off-site data storage associated with a client of the law firm via the network 106, and/or access publicly accessible data via the Internet, such as demographic data, market/financial data, etc.

Figure 2:
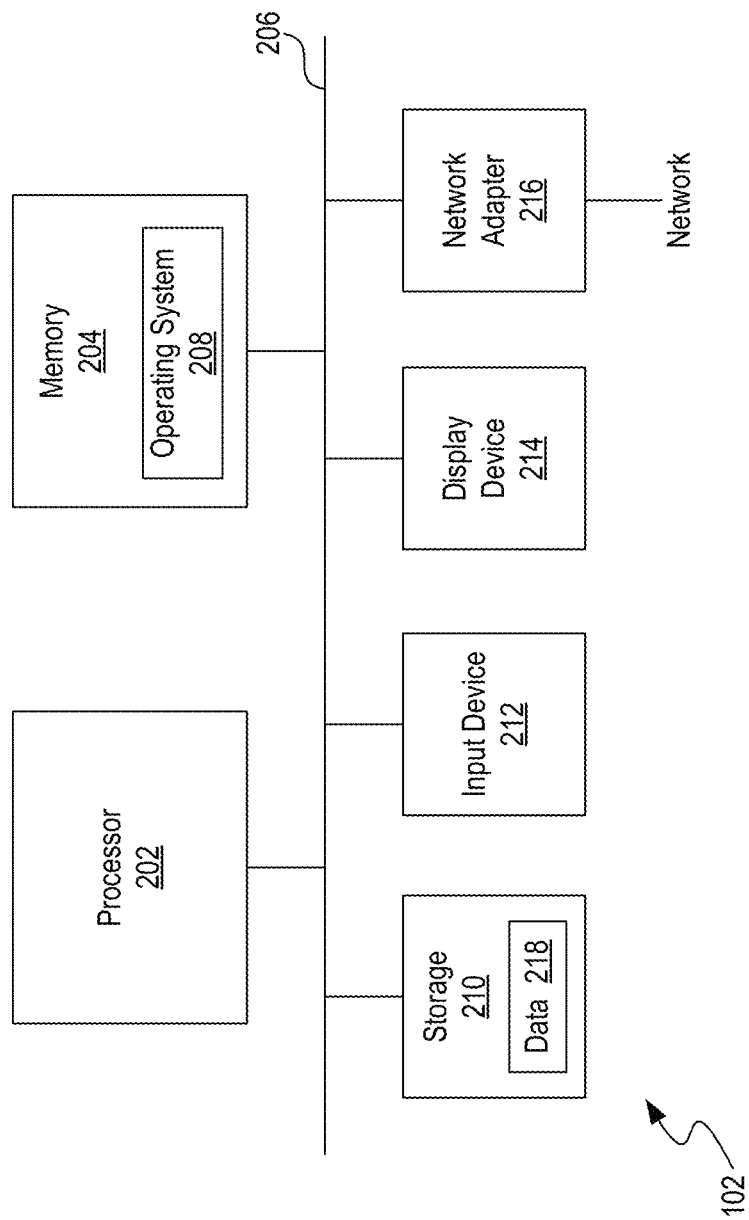
FIG. 2 is a high-level block diagram showing an example of the architecture of a device.

FIG. 2 is a high-level block diagram showing an example of the architecture of computers capable of implementing aspects of the present system, such as the computer 102. For purposes of illustration, FIG. 2 is described herein with reference to the computer 102, but the same or a similar architecture can be present in the mobile device 104 or various other devices capable of implementing aspects of the present system. The computer 102 comprises one or more processors 202 and memory 204 coupled to an interconnect 206. The interconnect 206 shown in FIG. 2 is an abstraction that represents any one or more separate physical buses, point-to-point connections, or both connected by appropriate bridges, adapters, or controllers. The interconnect 206 may comprise, for example, a system bus, a Peripheral Component Interconnect (PCI) family bus, PCIe, a HyperTransport or industry standard architecture (ISA) bus, a small computer system interface (SCSI) bus, a universal serial bus (USB), IIC (120) bus, or an Institute of Electrical and Electronics Engineers (IEEE) standard 1394 bus, sometimes referred to as "Firewire," Thunderbolt, etc.

The processor(s) 202 may comprise central processing units (CPUs) of the computer 102 and, thus, control the overall operation of the computer 102. In certain examples, the processor(s) 202 accomplish this by executing software or firmware stored in memory 204. The processor(s) 202 may be, or comprise, one or more programmable general purpose or special purpose microprocessors, digital signal processors (DSPs), programmable controllers, application-specific integrated circuits (ASICs), programmable logic devices (PLDs), or the like, or a combination of such devices.

The memory 204 is, or comprises, the main memory of the computer 102. The memory 204 represents any form of fixed or removable random access memory (RAM), read-only memory (ROM), flash memory, or the like, or a combination of such devices. In use, the memory 204 stores, among other things, an operating system 208 of the computer 102.

The computer 102 includes an input device 212, which allows a user to control the device. The input device 212 may include a keyboard, trackpad, touchscreen, or any other computer input device known in the art. The computer 102 also includes a display device 214 suitable for displaying a user interface, as described herein. The computer 102 further includes a network adapter 216 that enables the computer 102 to communicate with remote devices over a network, which may be, for example, a wireless adapter. The computer 102 may further include local storage 210 coupled to the interconnect 206. The local storage 210 may include, for example, a flash memory device configured to provide mass storage and store data 218 used by the computer 102. As described more fully in this specification, the device may store sufficient data in the local storage to enable usage when not connected to the network, synchronize offline data when reconnected to the network, and wipe data when no longer needed.

Figure 3A:
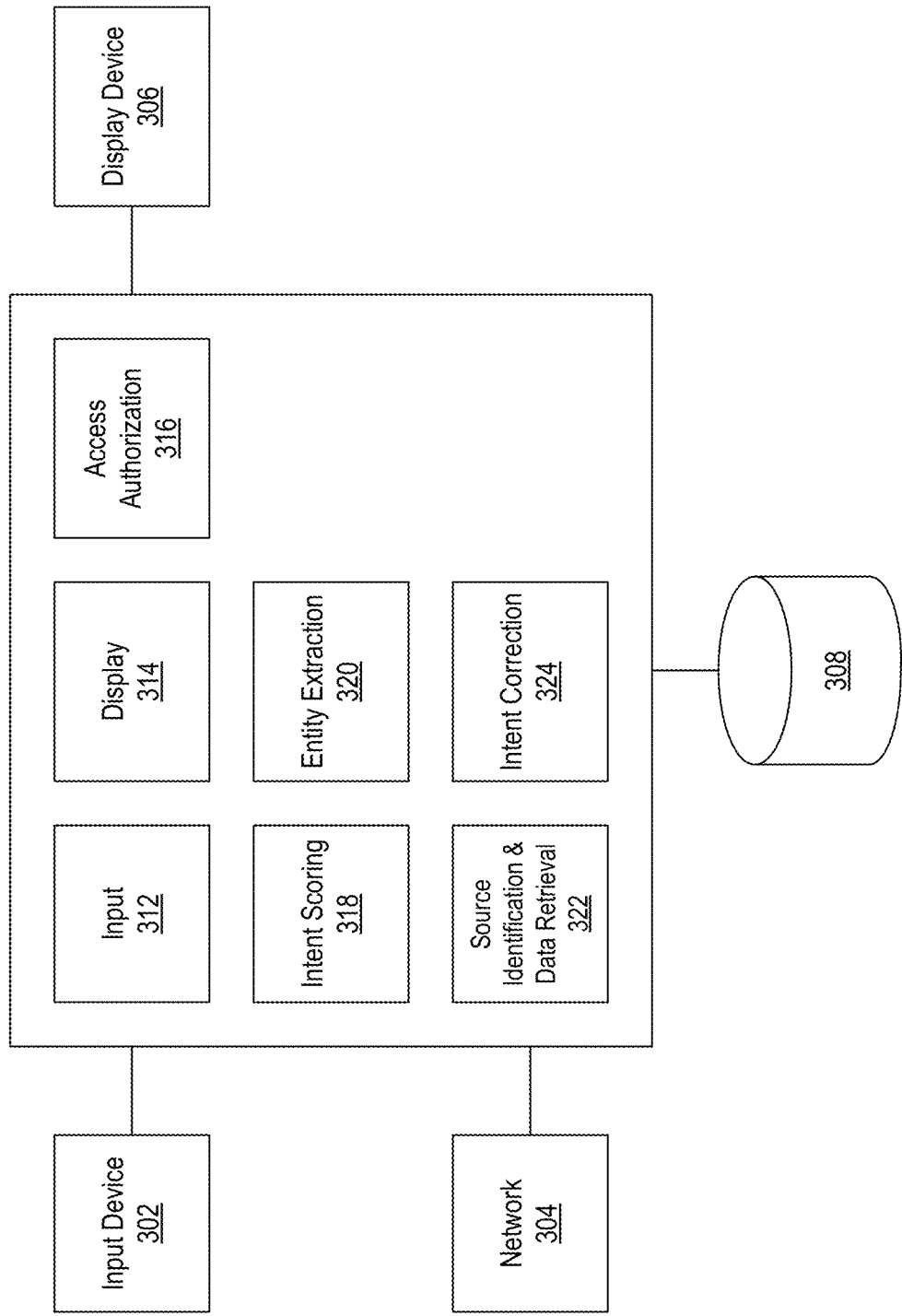
FIG. 3A is a block diagram illustrating components of a unified system to retrieve and display law firm analytic data in response to natural language queries.

FIG. 3A is a block diagram illustrating components of a unified system to retrieve and display law firm analytic data in response to natural language queries. The components of the block diagram can be implemented, for example, by the computer 102 of FIG. 2. Aspects of the components shown in FIG. 3A can be implemented as special-purpose hardware circuitry, programmable circuitry, or a combination of these. As will be described in additional detail herein, the system 300 comprises a number of modules to facilitate the functions of the disclosed system. In particular, the system 300 includes an input device 302, which is configured to receive input from the user. The input device 302 may include any input device known in the art, such as a keyboard, mouse, touchscreen, trackball, microphone, etc. The system 300 also includes an output device such as a display device 306 that displays the user interface provided by the system 300, as described herein, though a speaker, headset or audio output device can additionally or alternatively be used.

A network component 304 is configured to communicate with other computers, such as the server 108. The system 300 also includes a storage component 308, which stores data for the system, such as financial information, client information, attorney information, practice group information, and so forth. The storage component 308 may include local storage, storage on a server system, or a combination of both. The storage component 308 also stores data used by the system 300 including intents, example utterances corresponding to intents, and entity extraction information.

The system 300 includes an input component 312, which is configured to receive input to, and provide output from, the system via a user interface, such as described below with reference to FIGS. 5A-5J. The system 300 further includes a display component 314, which is configured to provide the user interface for display on the display device 306 and to display outputs of the system 300.

During operation, the system 300 receives a message at the input component 312. The message can be a plaintext message or a voice message that is converted to a plaintext message. The message includes information pertaining to a request for law firm information, which may be stored in the data storage component 308 or may be accessed via the network component 304. An intent scoring module 318 of the system 300 analyzes the message for variables (e.g., key words or phrases), generates a score for the message for each of multiple defined intents, as described herein, and determines an intent based on a highest generated intent score that exceeds a threshold. The intents and corresponding example utterances are stored in the storage component 308. The intent scoring module 318 uses one or more models such as AI models, which may also be stored in the storage component 308, to generate intent scores for the received message. In some implementations, the intent scoring module 318 trains the one or more AI models to generate intent scores using one or more training datasets (e.g., stored in the storage component 308) comprising example utterances and corresponding intents. In addition, the one or more AI models can be trained to extract a set of entities from a message. For example, the one or more training datasets may specify, for each example utterance, at least one entity in the utterance that can be extracted, which may be a word, phrase, number, string, or other entity. Using these training datasets, the one or more AI models can be trained to identify and extract entities (e.g., based on a determined intent) for new messages. An entity extraction module 320 extracts one or more data entities from the received message, as described herein, such as by using the one or more trained AI models. The source identification and data retrieval module 322 applies an algorithm, which may be stored in the data storage area 308, to identify a source for information requested in the received message and retrieve the information from the identified source. The identified source may be in the data storage area 308, or accessed through the network component 304. The display component 314 displays the retrieved information on the display device 306.

In some implementations, an intent correction module 324 allows a user to provide an indication, based on the displayed retrieved information, that the system 300 determined an incorrect intent. For example, the user may provide such an indication when the system 300 returns an unexpected result, or when the system is unable to determine an intent. The indication provided to the intent correction module 324 can include an indication that a received message corresponds to an intent other than the determined intent, and an indication of the corrected intent. The system 300 may store the corrected intent in the data storage component 308 and may also store the received message as an example utterance corresponding to the corrected intent. In subsequent operation, the system 300 applies the corrected intent and corresponding example utterance to determine the intent of subsequent received messages. Thus, the system 300 can use received corrected intents and corresponding example utterances to improve accuracy of intent determinations. In some implementations, corrected intents and corresponding example utterances are stored and used for retraining one or more AI models (e.g., by intent scoring module 318). Similarly, a user can also provide an indication of an incorrect entity extraction and an indication of one or more corrected entities to be extracted, which may be stored and used for retraining one or more AI models.

In some implementations, the system 300 determines, through an access authorization module 316, whether a user submitting a message is authorized to access information requested by the message. The access authorization module 316 may apply one or more lists of authorized users or user classes stored in the data storage area 308, such as by accessing a Microsoft Azure Active Directory. When the system 300 determines that a user is not authorized to access a data source identified by the source identification and data retrieval module 322, the display component 314 causes to be displayed at the display device 306 a message that the user is denied access to the identified data source. In some implementations, the access authorization module 316 applies one or more rules associated with screening users from data associated with one or more clients or matters (e.g., to enforce conflict of interest rules).

The system 300 can apply multiple levels of access authorization to grant, deny, or restrict access to information (e.g., based on different user types or classes). For example, the system 300 can authenticate a user to access the system 300 by validating access credentials, such as by using Microsoft Azure Active Directory. In addition, or in the alternative, the system 300 can access a security table that includes identifiers (e.g., email addresses, user names, employee numbers, etc.) for approved users and determine, based on a user identifier, whether a user is an approved user to access all or a portion of information that can be accessed by the system 300, In some implementations, the system 300 can require two-factor authentication of users to access the system (e.g., when a user logs in using an unknown device or outside of a virtual private network), such as a first authentication based on a user name and password and a second authentication by inputting a unique code provided by the system 300 to the user via a separate communication channel (e.g., a text message or automated phone call to a device associated with the user). In some implementations, the system 300 can further apply a row-level security model to restrict access or to grant different levels of access to information, e.g., based on different user types or classes. For example, using a row-level security model, the system 300 can determine that a flag or other indicator associated with a user indicates one or more restrictions regarding the information that may be accessed by the user, such as restricting the user's access to only certain data sources, restricting the user's access to information only about certain users, and so forth.

Figure 3B:
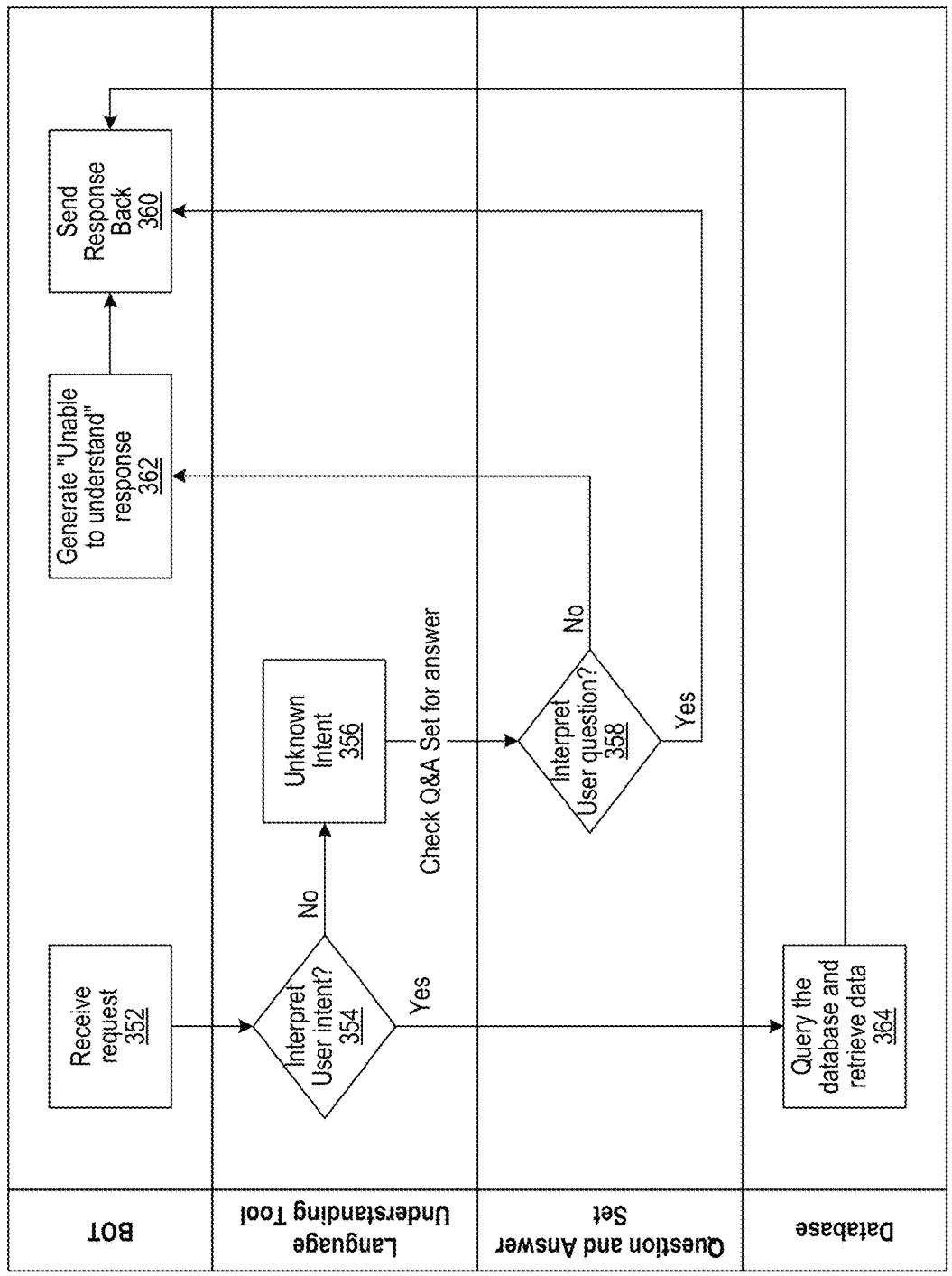
FIG. 3B is a flow diagram of a process for displaying requested information in response to natural language queries, including accessing stored question and answer sets.

FIG. 3B is a flow diagram of a process 350 for displaying requested information in response to natural language queries, including question and answer sets. The process 350 begins at a block 352, where a bat of the system receives a request as a natural language plaintext message. The message represents a request to retrieve information about or maintained by a law firm.

At a block 354, the system interprets a user intent for the message, as described herein, such as by employing Microsoft language understanding tool (LUIS). Interpreting the user intent comprises, for example, applying one or more trained AI models to generate intent scores each corresponding to an intent and selecting at least one intent based on a highest intent score.

At a block 356, the system can determine that the intent of the message is unknown. Message intent can be unknown when a highest generated intent score for a message does not exceed a threshold. Additionally or alternatively, message intent can be unknown when a highest generated score corresponds to an intent defined as "unknown intent." In some implementations, a default status of "no intent" can be assigned to a message for which no intent score exceeds a defined threshold score.

At a block 358, if the system determines that message intent is unknown, the system can interpret the message using a stored question and answer set to determine whether the message matches a question in the stored question and answer set, such as by employing Microsoft Azure QnA Maker tool. For example, the system can compare the message, based on variables (e.g., key words or phrases) or similarity to example utterances, to each of multiple questions stored in a set of frequently asked questions, each having a corresponding answer. Frequently asked questions may be stored, for example, on a web page, in a spreadsheet, or in a text document.

If the system determines that the message matches one of the stored questions, the system extracts the answer corresponding to the stored question and sends the response to the bot of the system for display in a GUI at a block 360.

If the system determines that the message does not match one of the stored questions, the system generates a response at a block 362 indicating that the system is unable to interpret the received message, and sends the response to the bot of the system for display in a GUI at block 360. The message generated at block 362 can be, for example, an error message or a message directing a user to contact a person or group within the firm to help the user.

If, at block 354, the system is able to determine an intent for the message, then the system proceeds to block 364 and queries a database to retrieve data requested in the message, as described herein. For example, based on the determined intent for the message, one or more entities are extracted from the received message and the entities are included in a query to the database to retrieve the data. In response to the query, the system sends the retrieved data to the bot of the system, which configures the retrieved data for display in a GUI at a block 360.

Figure 4:
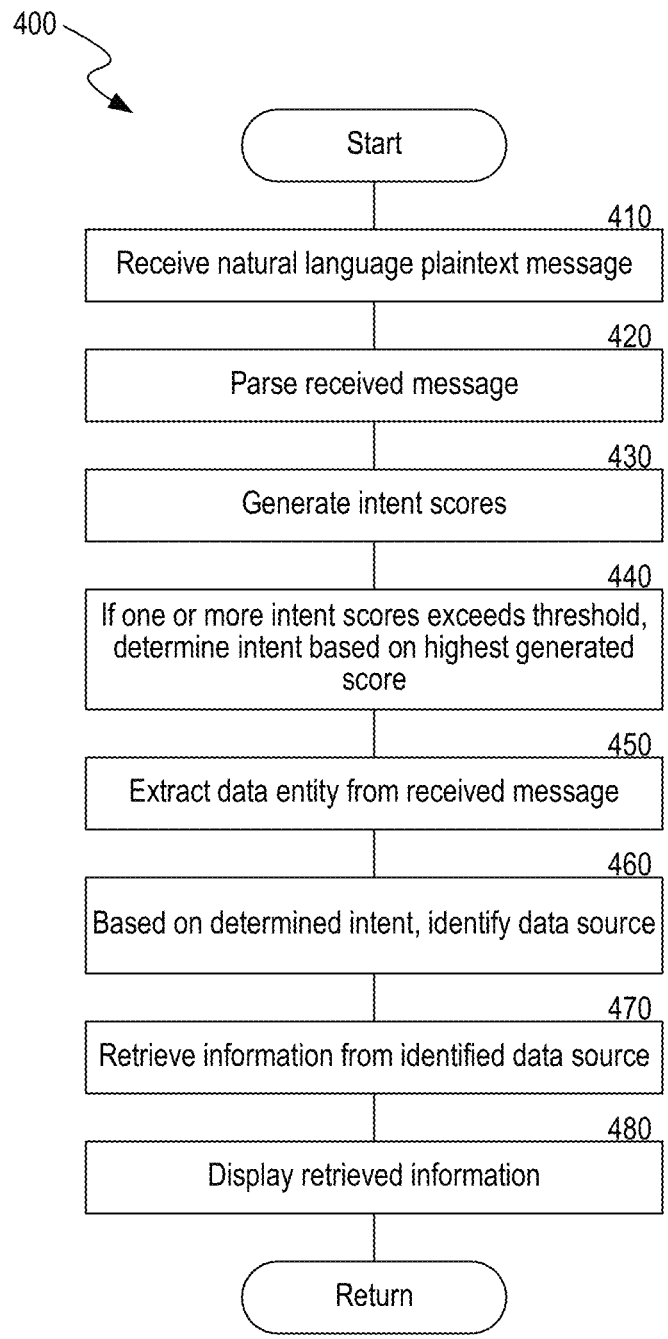
FIG. 4 is a flow diagram of a process for retrieving and displaying law firm analytic data in response to natural language queries.

FIG. 4 is a flow diagram illustrating a process 400 for retrieving and displaying law firm analytic data in response to natural language queries. The process 400 begins at a block 410, where the system receives a natural language plaintext message. The message comprises a request for information about or maintained by a law firm. In some implementations, the message is submitted through an interface, bot, or GUI associated with the system. The message can alternatively be received in an audio format, such as through a voice command or query, which is converted to plaintext.

At a block 420, the system analyzes the received message for variables or other content, such as based on similarity to example utterances, or by identifying key words or phrases based on proximity to known words or phrases. For example, the message can be analyzed to identify or extract specific words, combinations of words, phrases, or grammatic structures that are relevant to an intent of the message.

At a block 430 the system generates a score (e.g., using a trained AI model) for the message for each of multiple defined intents, such as by employing Microsoft language understanding tool (LUIS). The defined intents represent the various queries or types of queries that can be answered by the system. Intents may include, for example, lawyer performance, firm performance, practice group or subgroup performance, client information, and so forth. Each intent is associated with one or more example utterances. For example, for an intent of Client_Information, an example utterance may be stored by the system of: "Fees collected from client Microsoft in April?" The system associates the terms and structure of this example utterance with the corresponding intent, and scores all messages based on similarity or dissimilarity to the example utterance. An intent score can be, for example, a numerical score.

At a block 440, if at least one of the generated intent scores exceeds a threshold, then the system determines an intent for the message based on the highest generated intent score.

At a block 450 the system extracts at least one entity from the received message (e.g., using a trained AI model). The extraction may be based, at least in part, on the determined intent for the message. The extracted data entity may be, for example, a number or a string representing, e.g., a date, an attorney name, a client name, a practice group or subgroup, an office, a law firm financial metric, a document name or type, and so forth. Examples of some financial and attorney metrics are found in the assignee's U.S. Pat. No. 9,672,573 and 10,249,005, both entitled "Graphical User Interface for Facilitating Allocation of Variable Compensation," and which are hereby incorporated by reference.

At a block 460 the system identifies a data source from which to retrieve the information requested by the received message. The data source is identified based on an algorithm applied to the determined intent and the extracted entities. An example algorithm for identifying a data source can be as follows:

Intent=ClientBilling, then access law firm financial database,
else if Intent=TimekeeperData, then access timekeeping database, else if Intent=EmployeeRecords, then access human resources database, else if Intent=PracticeGroupData, then access practice group database, etc.

In some implementations, the system can identify multiple data sources from which to retrieve information responsive to the received message. In some implementations, a master process (e.g., a stored procedure in an SQL server) identifies the data source and a child process, which may be based on the determined intent and an algorithm of the master process, defines operations for retrieving information from the identified data source. The child process can include an algorithm that applies the determined intent and other received variables (e.g., extracted entities) to identify one or more data records in the identified data source from which to retrieve information. For example, a master process can identify a database from which to retrieve information, as demonstrated in the above example algorithm. A child process then defines operations performed by the system to retrieve the specific information from the database identified by the master process. If a user submits a message of "What is my hire date?" then a master process can identify that the requested information is stored in a human resources database, based on an intent score for the message. An associated child process can define a process for the system to retrieve specific pieces of information from a record in the human resources database, based on the determined intent and entities extracted from the message. The child process, for example, can associate an extracted entity "my" with records for the user submitting the query. The child process can further associate an extracted entity "hire date" with one or more specific records in a human resources database. The child process then identifies, within a specific record in the human resources database, which piece of information corresponds to the entity "hire date," and extracts the identified piece of information.

At a block 470 the system retrieves information from the identified data source. The data is retrieved based on the determined intent and the extracted entities. Retrieving information can be based on a child process, as described above. Retrieving information can also include processing information in other ways, such as by formatting the retrieved information, producing any calculated metrics or analyses of retrieved information, creating visualizations of the retrieved information, and so forth.

At a block 480 the system displays the retrieved information. The retrieved information is formatted and displayed, e.g., at an interface, GUI, or bot. The information can be displayed, for example, as a text or chat message, a visualization, as a link to a document or report (e.g., on a web page, in a PDF document or other file format, in a linked image, and so forth). In some implementations, the retrieved information is displayed using one or more customized tools that facilitates analysis of the retrieved information. For example, the one or more customized tools can be a specially configured functional interface, a report, a recommendation, a graph, a table, a chart, or any combination thereof, which helps the user to analyze and/or navigate the retrieved information. In an example implementation, the system can display an interface comprising a graph or chart of financial information requested by a user that also includes comparative information, such as year-over-year statistics, pace information, averages, comparison to budgeted numbers, and so forth. In some implementations, the one or more customized tools are interactive, such as by allowing a user to click on individual pieces of data to access data sources, zoom in on a region of the GUI for more detailed analysis, generate projections based on at least a portion of the retrieved information, and so forth. In some implementations, the system selects, from a set of customized tools, a customized tool that is most relevant to retrieved information (e.g, based at least in part on an intent score for a corresponding message) and displays the retrieved information using the selected customized tool.

Although the process 400 of FIG. 4 shows a particular order for the illustrated operations, the operations can be performed in a different order. Additionally, operations can be added to or omitted from the process without deviating from the teachings of the present technology. In some implementations, if no intent score exceeds a threshold (e.g., at block 440), then the system returns a message such as an error message or a suggestion of alternative queries based on the received message. Additionally or alternatively, an intent can be defined as "no intent," where a high score for this intent indicates that no intent is determined.

In some implementations, the process 400 can include receiving feedback based on the information retrieved in response to the query. For example, if the system retrieves and displays incorrect or unexpected information in response to a query, a user can give an indication that the system incorrectly determined the intent. The indication may be by, for example, giving a voice or text command, or pressing a button (e.g., a physical button or key, or a software icon or button). In the same or other implementations, the system can be corrected or retrained, such as by receiving a selection of a corrected intent, receiving or storing a new example utterance corresponding to the corrected intent, or otherwise retraining a model based on new or ongoing inputs, or any combination of the above. For example, when the system receives a corrected intent, the system may prompt the user to input an example utterance, or store the received message as an example utterance.

In some implementations, the process 400 can further include determining whether a user submitting the message is authorized to access the identified data source, as described herein. In these and other implementations, the process 400 automates law firm data security functions of granting or denying access to law firm data, e.g., based on defined user classes and/or one or more screening rules.

In some implementations, additional information can be needed to interpret a received message. Thus, for example, before or after identifying a data source at block 460, the process can include an operation to prompt the user to provide additional information. The prompt can, for example, include selectable icons that allow the user to provide additional information before the information is retrieved at block 470 and displayed at block 480. Alternatively, the process can include displaying a message to prompt the user to provide additional information in other forms, such as by submitting an additional message, giving a command, and so forth. Additional description of the feature described in this paragraph is provided below with reference to FIG. 5A.

In some implementations, the system can determine intents (e.g., at blocks 430-440) or extract data entities (e.g., at block 450) based in part on stored keywords that correspond to meaningful information in a received message. For example, the system can store keywords of "attorney," "lawyer," or "timekeeper," which indicate that a word or phrase immediately following these keywords in a message will correspond to the name of a person who is an attorney or other timekeeper of the firm. These keywords, thus, help the system more accurately determine intents and identify entities to be extracted from a received message. Other keywords can correspond to, for example, matters, clients, accounts, vendors, consultants, staff, opposing parties, judges, and so forth.

FIGS. 5A-5J illustrate a user interface for interacting with a unified system to retrieve and display law firm analytic data in response to natural language queries. The user interface can be displayed under the control of the computer system described in FIG. 2. The user interface provides a chat window for a user to interact with the system.

Figure 5A:

FIG. 5A illustrates an example interaction between a user and the system where the system, by the interface, prompts the user for additional information. In the example interaction, a user submits at the interface a message 512 asking "On what matters is Anthony working?" Upon determining that additional information is needed, the system displays at the interface a prompt 514 including multiple selectable icons and a response message of "Which timekeeper did you mean?" In other words, the system has determined an intent of the message 512 and extracted the entity "Anthony," which the system associates with the name of a timekeeper (e.g., an attorney, patent agent or paralegal). But the system has identified multiple timekeeper records associated with the extracted entity, each corresponding to a different timekeeper. Thus, the system displays the prompt 514 to prompt the user to input additional information before retrieving information in response to the message 512, the prompt 514 comprising multiple selectable icons each corresponding to one of the multiple timekeepers identified by the system. In response to the prompt 514, a user selects one of the multiple selectable icons. The selection of one of the multiple selectable icons causes the system to receive, at the interface, an additional input 516. In some implementations, additional information can be received through a second message or other means of input. In response to the additional input 516, the system displays information 518 retrieved from a data source in response to the message 512 and the additional input 516 provided by the selection of the selectable icon. Thus, if the user selects one of multiple displayed timekeepers, e.g. "Anthony Johnson," the system displays at the interface a real-time (e.g., up-to-the-minute) summary of statistics for timekeeper Anthony Johnson, including a default number of matters on which the timekeeper has worked for a defined time period (e.g., in the last month), a number of hours worked on each matter, an amount billed for each matter, and so forth.

For at least some of the defined intents, the system can retrieve and display a default set of information where the received message does not specify a specific parameter. For example, the question "What matters is Anthony working on?" corresponds to a default response that includes matter information for a one-month period preceding the time that the message is received. But a question of "What matters is Anthony working on since January" generates a different response, including matter information from January of the current year up until the time that the message is received.

Figure 5B:
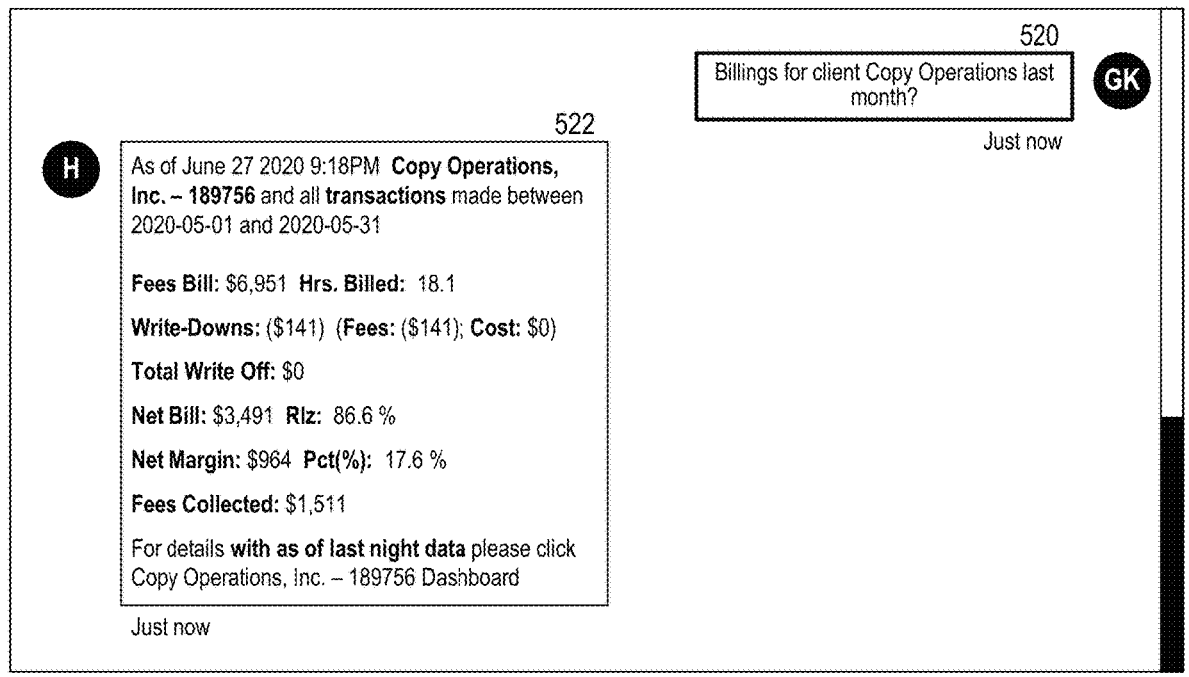

FIG. 5B illustrates another example interaction between a user and the system. The user submits a message 520 at the interface asking for "Billings for client Copy Operations last month?" The system receives the message, determines the intent for the message, extracts data entities from the message, and retrieves information responsive to the message from an identified data source by applying an algorithm to the received message and the extracted data entities, as described herein. In response to the message 520, the system displays, at the interface, a response 522 including information retrieved from the identified data source.

Figure 5C:
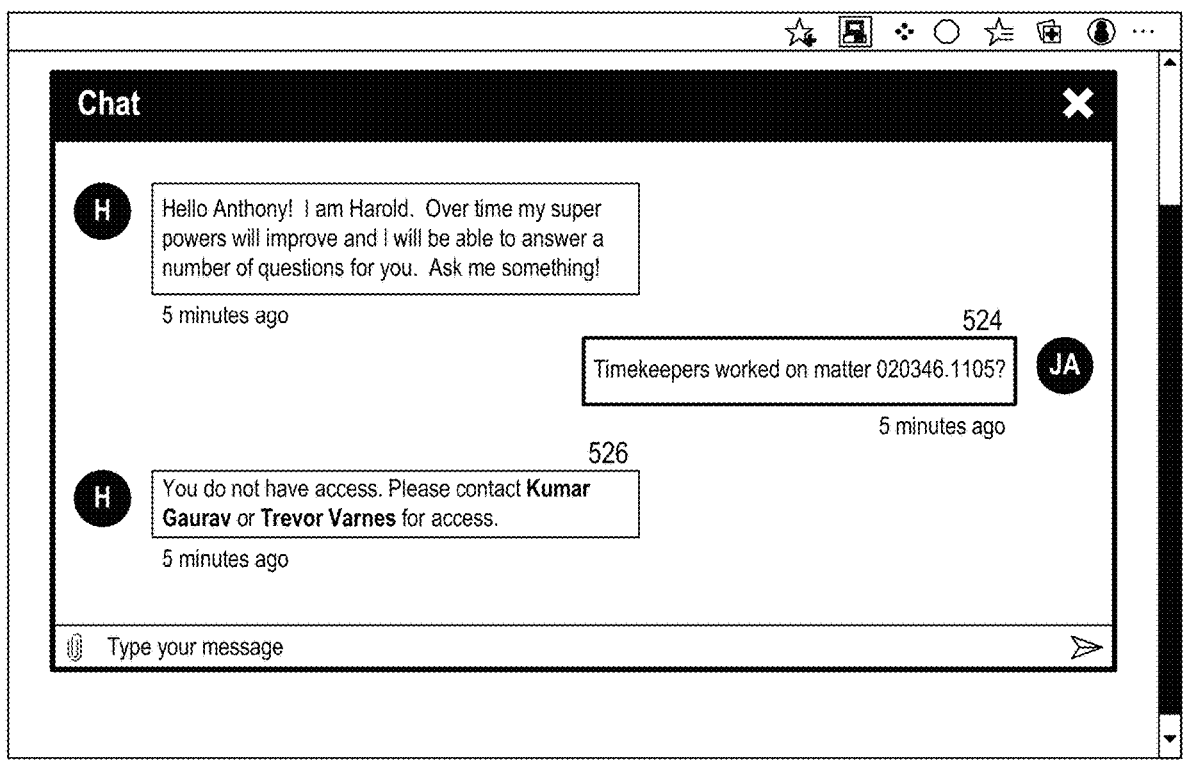

FIG. 5C illustrates another example interaction between a user and the system. In this example interaction, the system determines that a user is not authorized to access information from an identified data source. The user submits a message 524 at the interface asking for "Timekeepers worked on matter 020346.1105?" After determining an intent for the message 524, extracting entities, and identifying a data source to retrieve information, the system can determine that the user associated with the received message is not authorized to access the identified data source. The system then displays, at the interface, a response 526 stating "You do not have access." To determine whether a user is authorized to access an identified data source, the system stores or accesses one or more lists of users and corresponding levels of access. These lists may be structured in various ways using, for example, tables and/or databases. The levels of access may be based on different user classes. For example, partners in the law firm may have generally unlimited access to all data sources. Non-partner attorneys, associates, or law firm staff may have only limited access, such as access to data sources that store information only about the individual user. In these and other implementations, one or more lists may additionally or alternatively relate to user restrictions and/or rules associated with screening of users (e.g., based on conflict of interest or other ethical rules, which differ among states and thus affect personnel in an interstate law firm differently depending upon the state in which they practice), which may limit or prohibit a user's access to data related to one or more clients and/or one or more client matters.

Figure 5D:
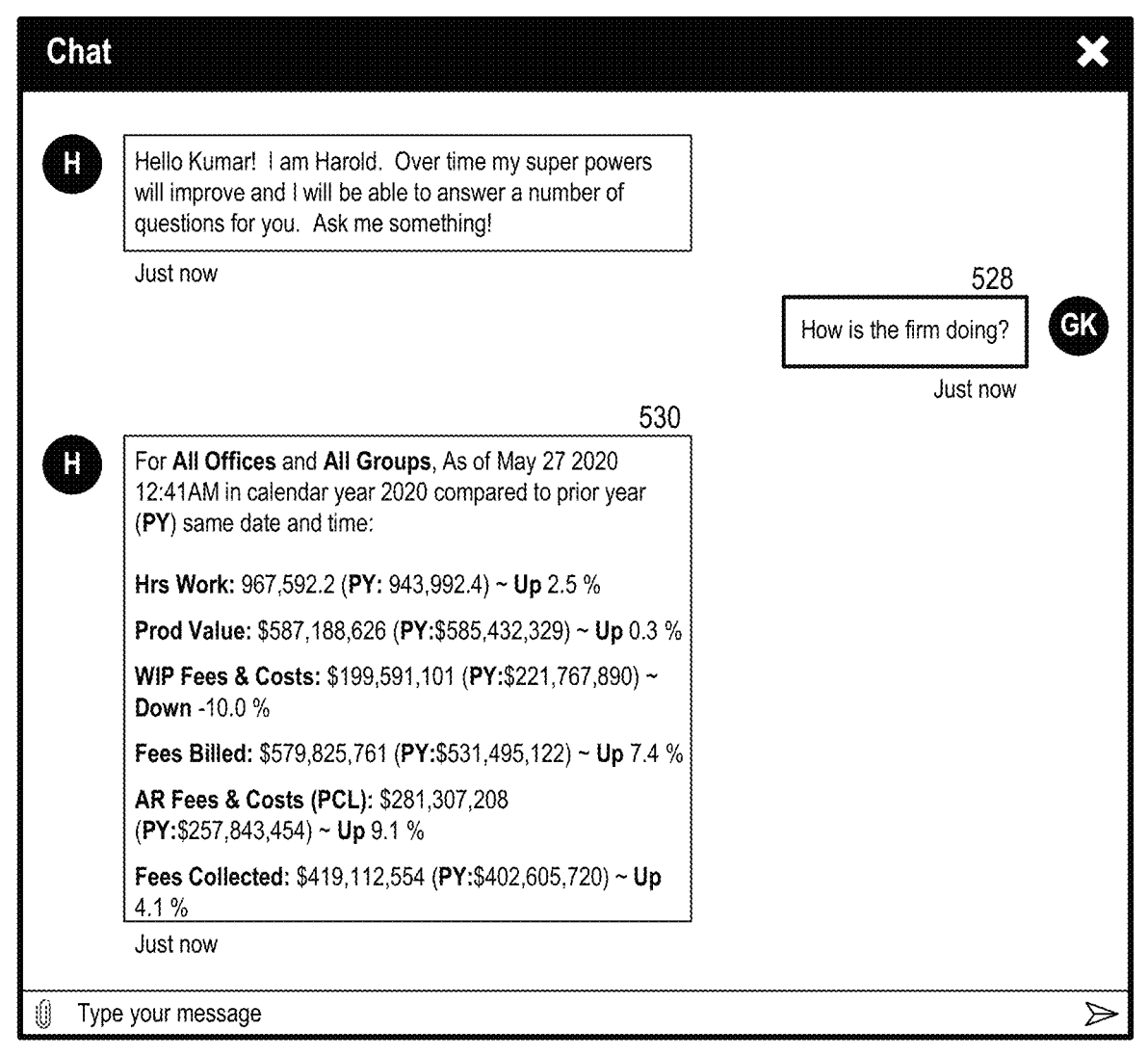

FIG. 5D illustrates another example interaction between a user and the system. The user submits a message 528 at the interface asking "How is the firm doing?" The system receives the message 528, determines an intent, extracts data entities, and retrieves information responsive to the message 528 from an identified data source by applying an algorithm to the received message and the extracted data entities, as described herein. In this example interaction, the user does not specify particular pieces of information for the system to return in relation to the extracted entity "firm." In other words, the user requests a general report about the performance of the law firm without specifying what information is requested. The system displays, at the interface, a response 530 providing a default set of data relative to the law firm that includes real time statistics about law firm performance in the current year, including total hours worked, production value, work in progress (WIP), fees billed, accounts receivable (AR), and fees collected. The system can also display the foregoing statistics in comparison to the prior year (PY), and an indication of whether each statistic is above or below that of the prior year, including a percentage of increase or decrease.

FIG. 5E illustrates another example interaction between a user and the system. The user submits a message 532 at the interface asking for "Top 10 clients in the firm?" The system receives the message 532, determines an intent, extracts data entities, and retrieves information responsive to the message 532 from an identified data source by applying an algorithm to the received message and the extracted data entities, as described herein. The system then displays, at the interface, a response 534 providing a list of clients in order of decreasing billing amounts for a default period of time, such as a period of one month up to the date of the received message.

Figure 5F:
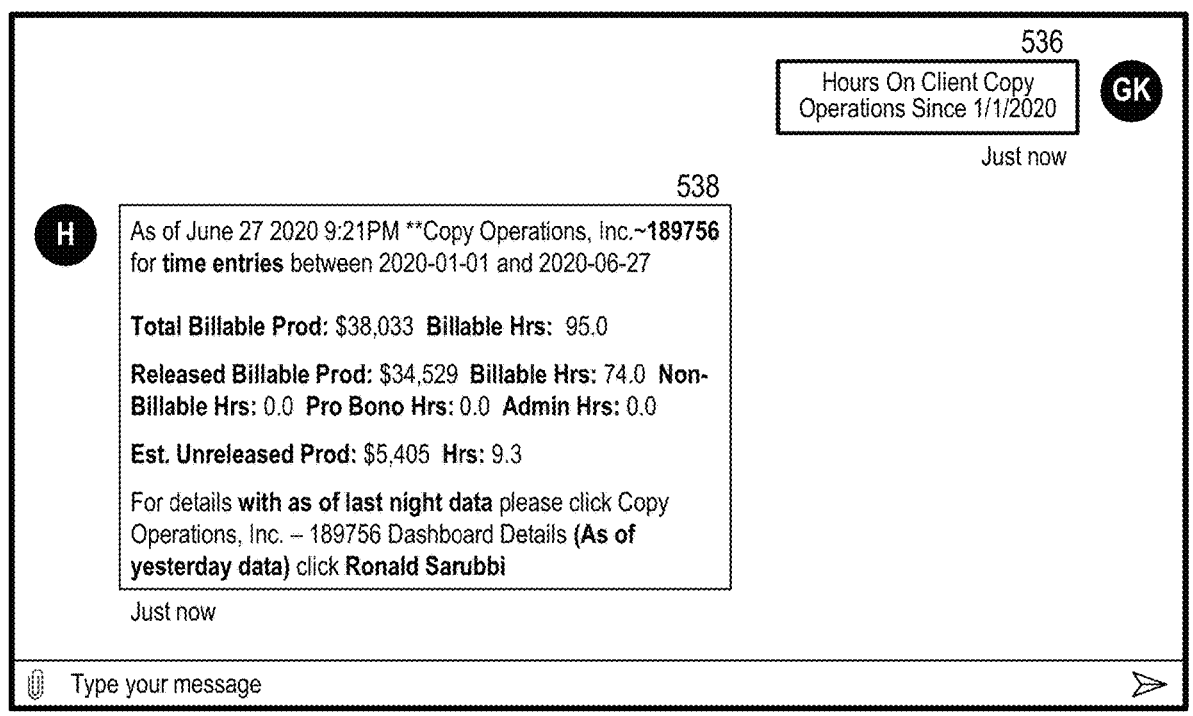

FIG. 5F illustrates another example interaction between a user and the system. The user submits a message 536 at the interface asking for "hours on client Copy Operations since 1/1/2020?" The system receives the message 536, determines an intent, extracts data entities, and retrieves information responsive to the message 536 from an identified data source by applying an algorithm to the received message and the extracted data entities, as described herein. The system then displays, at the interface, a response 538 providing a default set of billing information for the time period specified in the message 536, including billable production, billable hours, unreleased hours, etc. For unreleased hours, the system can also provide an actual or estimated value of the unreleased time.

Figure 5G:
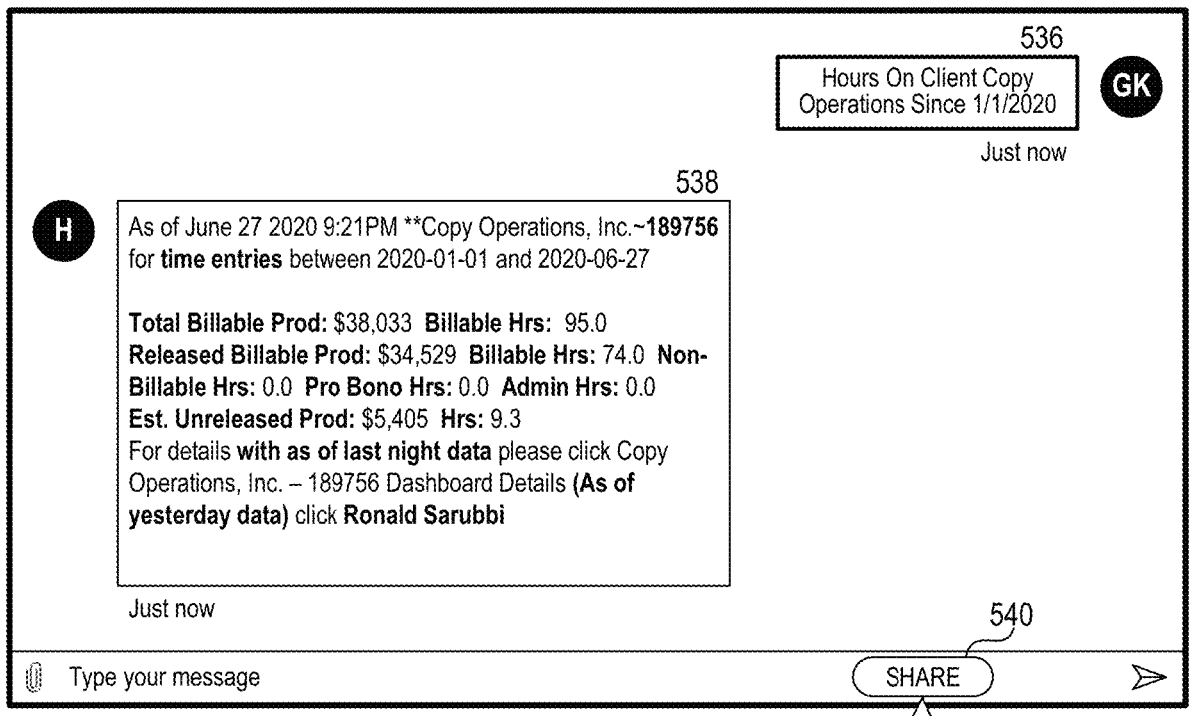

FIG. 5G illustrates another example interaction between a user and the system. The interaction includes the message 536 and response 538 of FIG. 5F. However, in this example interaction, the system includes a share icon or button 540. The user selects the share icon or button 540, such as by clicking. Selecting the share icon or button 540 causes a fillable or selectable field 542 to be displayed, by which the user can specify a manner of sharing the content being displayed at the interface of the system. Sharing can include, for example, typing or selecting a recipient email address in the fillable or selectable field 542, which causes the system to transmit the displayed content to the recipient in an email (e.g., as an image, an attachment, a link, and so forth). In some implementations, the fillable or selectable field 542 provides additional options for sharing (not shown), such as options for sharing displayed content in an instant message or a collaboration system. In addition, sharing can optionally include a customized or automated message from the user, such as a message that informs the recipient about the shared content or a user who shares the content. In these and other implementations, a user sharing content can include a personalized message that will be transmitted to a recipient with the shared content.

Figure 5H:
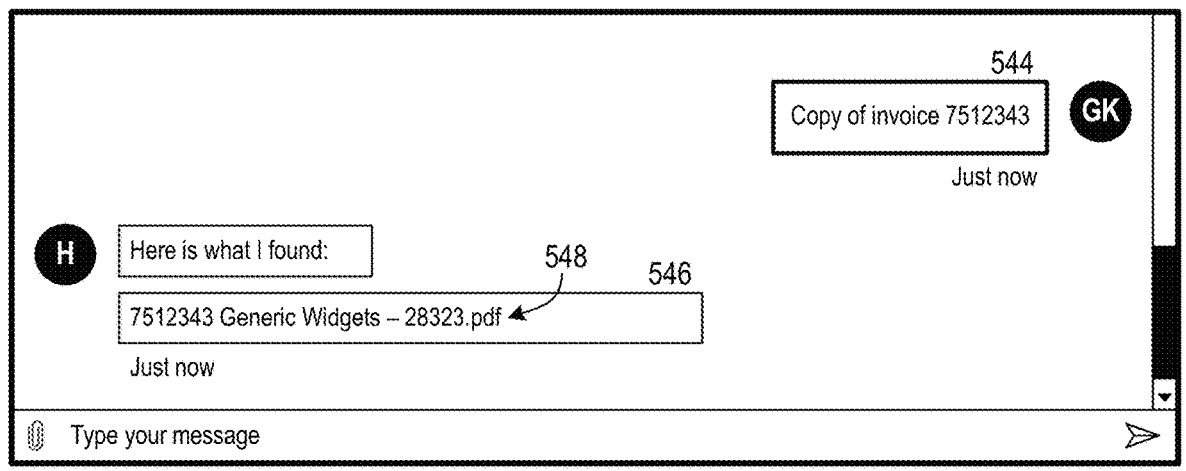

FIG. 5H illustrates another example interaction between a user and the system. In this example interaction, the user submits a message 544 at the interface asking for "Copy of invoice 7512343." The system receives the message 544, extracts data entities, and retrieves information responsive to the message 544 from an identified data source by applying an algorithm to the received message and the extracted data entities, as described herein. The system returns a response 546 including a message of "Here is what I found:" The response 546 further includes a link 548 that is actionable to retrieve a document or other content (not shown), such a PDF document of the retrieved information (e.g., based on the identifier for the invoice extracted from the message 544). In some implementations the link 548 is actionable to access information in other forms, such as on a web page, in other document formats (e.g., Microsoft Word), as images, spreadsheets, and so forth.

Figure 5I:
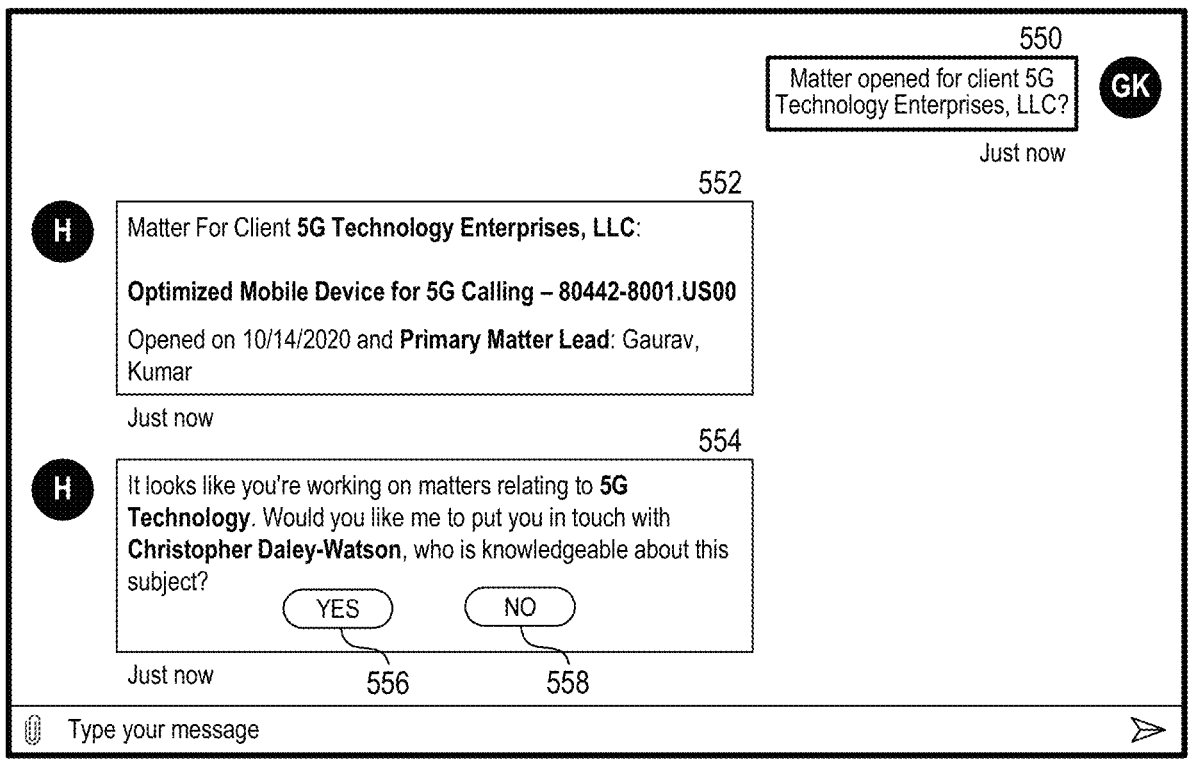

FIG. 5I illustrates another example interaction between a user and the system. In this example interaction, the user submits a message 550 at the interface asking for "Matter opened for client 5G Technology Enterprises, LLC?" The system receives the message 550, extracts data entities, and retrieves information responsive to the message 550 from an identified data source by applying an algorithm to the received message and the extracted data entities, as described herein. The system returns a response 552 responsive to the message 550 including information about a most recent client matter opened for client 5G Technology Enterprises, LLC. In this example, the matter name is "Optimized Mobile Device for 5G Calling." Based on, for example, the client name or the matter name, the system further determines that the term 5G is a key word that corresponds to a type of matter handled within the firm. For example, key words can be identified based on stored tables, lists, or data records, or based on an AI-trained model that classifies matters or clients, e.g., based on areas of law, technologies, business types, etc., and generates associations between attorneys or employees of the firm and clients, matters, areas of law, technologies, business types, and so forth. In some implementations, the system can also access a stored description or other information relating to the client or matter to determine key words or phrases that are indicative of a type of matter or client. In this case, the system associates the term "5G" with the subject of "5G Technology." The system accesses a stored database or other data source to determine whether any known attorneys (e.g., other users of the system) are associated with the identified key word. Upon identifying an attorney associated with the key word, the system displays a second response 554 that includes a message "It looks like you're working on matters relating to 5G Technology. Would you like me to put you in touch with Christopher Daley-Watson, who is knowledgeable about this subject?" In other words, the second response 554 suggests to the user that the user collaborate with a known attorney based on a determination that, e.g., clients, matters, matter types, or subject matter are common to the user and the known attorney. The second response 554 further includes selectable buttons or icons 556 and 558 corresponding to "yes" or "no" answers to the second response 554. If the user selects a button or icon 556 corresponding to "yes," then the system can initiate a contact to the known attorney identified in the second response 554, such as by causing an email to be transmitted, sending an instant message, automatically scheduling a meeting (e.g., on Microsoft Outlook calendars for both users), and so forth.

In some implementations, the system displays other personalized messages or recommendations, which may be based in part on received messages from the user. In these and other implementations, the personalized messages or recommendations may additionally or alternatively be based on profile information associated with a user. For example, the system can store or access user profile information including employment records (e.g., name, birthdate, practice area, years of service, hire date, etc.), timekeeper information (e.g., hours recorded, released, billed, collected, etc.), usage history (e.g., messages submitted to the system, etc.), and other profile information. The system then uses the profile information to generate personalized messages or suggestions, which can include, for example, birthday greetings, reminders, status information (e.g., whether a user has unreleased time, whether a user has met billable hour expectations in a time period, etc.).

Figure 5J:
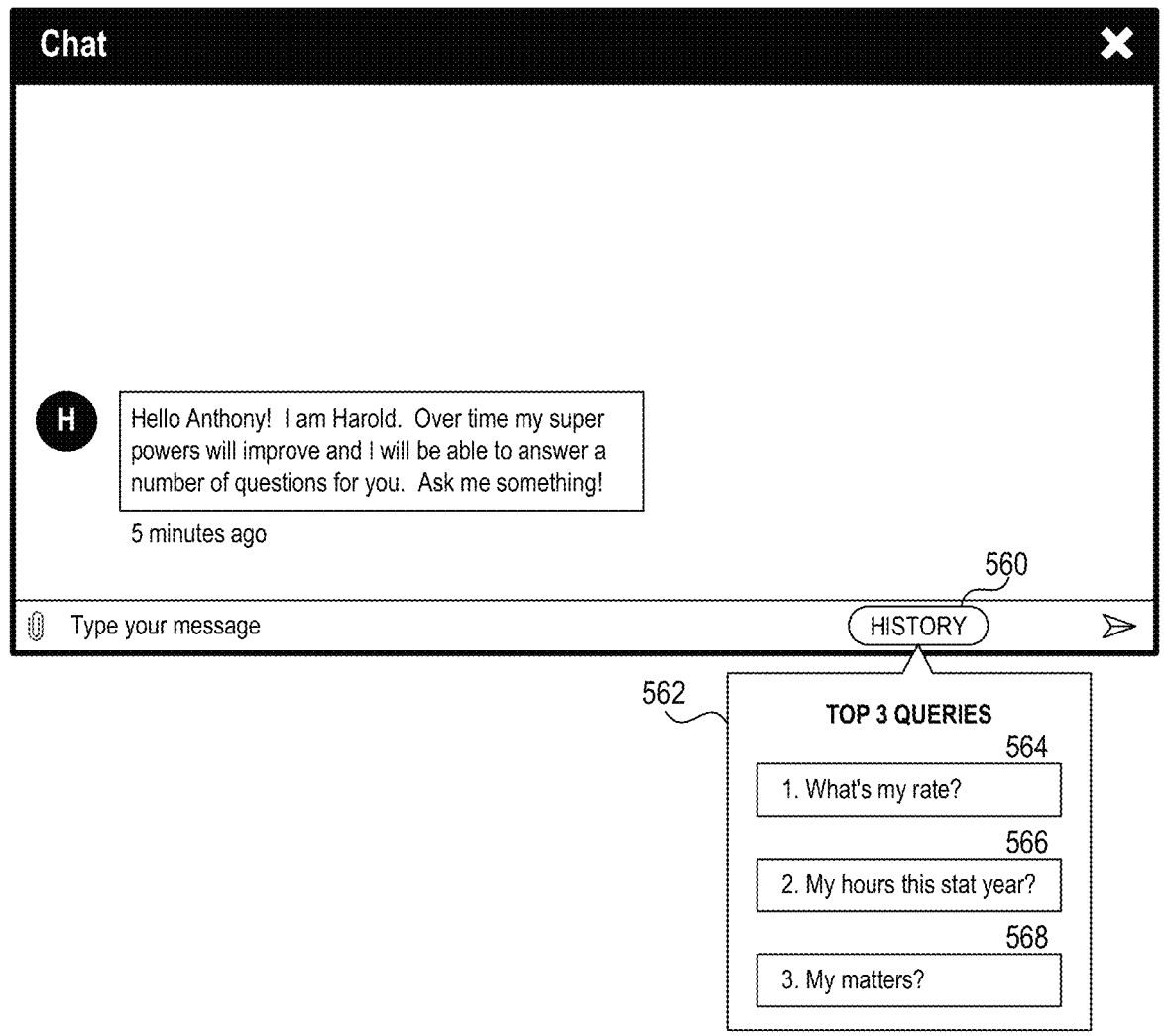

FIG. 5J illustrates another example interaction between a user and the system. In this example interaction, an interface of the system includes a saved history of queries submitted by the user, which may be accessed using a selectable button or icon 560. When the selectable button or icon 560 is selected (e.g., by clicking), the system causes to be displayed a pop-up window or menu 562 that includes a saved history of queries submitted by the user. In this example, the history is displayed as a "top 3" list in order of decreasing frequency. In other implementations, a displayed query history can be sorted according to different orders, such as in chronological order, based on user-defined settings or preferences, and so forth. The pop-up window or menu 562 includes selectable buttons or icons 564, 566, and 568, each corresponding to one of the saved queries in the history of queries. When the user selects one of the selectable buttons or icons 564, 566, or 568, the selection causes the corresponding saved query to be submitted to the system without the saved query being retyped into the bot of the system. In some implementations, queries stored in a history can be submitted in other ways, such as by autofilling a query at the interface.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, in general, the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, including any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A computer-implemented method for retrieving and displaying law firm analytic data for analysis in response to plaintext queries, the method comprising:

receiving, at a graphical user interface (GUI) and input by a user, a natural language plaintext message comprising a request for one or more pieces of information about or maintained by a law firm;

analyzing the received message for at least one variable, wherein the at least one variable includes a key word or phrase in the received message;

for each of multiple possible intents, generating an intent score based at least in part on the at least one variable, wherein each generated intent score indicates a likelihood that the received message corresponds to one of the multiple intents, wherein the multiple intents include intents corresponding to at least two of: lawyer performance, law firm performance, law firm practice group performance, or law firm client information, and wherein each generated intent score is based on comparing the received message to multiple example utterances corresponding to each of the multiple possible intents;
if one or more generated intent scores exceeds a threshold score, determining an intent based on a highest generated intent score;
determining that the intent with the highest intent score is a compound intent;
wherein a compound intent is intent that corresponds to two or more pieces of information from two or more data sources;
dividing the received message into two or more parts,
wherein each of the two or more parts corresponds to a single intent of the compound intent;
extracting, from each part of the received message, at least two data entities,
wherein the at least two data entities includes two or more of: an attorney name, a law practice group name, a client name, a geographic office name, a date, or a law firm financial metric;
identifying, based on each determined intent, at least one data source from which to retrieve the requested one or more pieces of information about or maintained by the law firm,
wherein the data source is identified based on the determined intent and the extracted at least two data entities, and
wherein the data source includes a human resources database, an attorney timekeeping database, a law firm financial database, a client invoicing database, a client document management database, or any combination thereof;
retrieving from the identified data source, and based on the determined intent and the at least two data entities, the requested one or more pieces of information about or maintained by the law firm;
analyzing the one or more pieces of information about or maintained by the law firm for each part of the received message to determine a single combined output method for each part;
combining the one or more pieces of information about or maintained by the law firm for each part of the received message into a single output,
wherein the single output includes each piece of information for each part of the received message, and
wherein the output includes charts, graphs, recommendations, dashboards or reports; and
displaying, at the GUI, the single output of the at least two parts of the received message.

2. The computer-implemented method of claim 1, further comprising:
if none of the one or more generated intent scores exceed the threshold score, then displaying, at the GUI, a message comprising an indication that no intent is determined, and a suggestion of one or more alternative queries.

3. The method of claim 1, wherein the one or more pieces of information include: a billing rate, an attorney performance metric, accounts payable information, accounts receivable information, an invoice, or any combination thereof.

4. The method of claim 1, further comprising:
in response to the received message, retrieving a response from a predetermined question and answer set; and
displaying the retrieved response in the GUI, wherein the GUI is presented via a web browser.

5. The method of claim 1, wherein the intent is determined based on an artificial intelligence (AI) natural language processing model, the method further comprising:
receiving an indication from the user that the determined intent is incorrect;
receiving a selection of a corrected intent; and
storing the received message as an example utterance corresponding to the corrected intent, wherein receiving an indication that the determined intent is incorrect includes receiving a second plaintext message or receiving a selection of a button, key, or icon.

6. The method of claim 1, further comprising:
identifying, in the received message, at least one keyword,
wherein the at least one keyword is associated with a client name, a matter type, an area of law, or any combination thereof;
associating, based on the at least one keyword, the user with the client name, matter type, area of law, or combination thereof that is associated with the keyword;
identifying a different user associated with the client name, matter type, area of law, or combination thereof; and
transmitting a message to the user,
wherein the message informs the user that the different user is associated with the client name, matter type, area of law, or combination thereof.

7. The method of claim 1, further comprising:
determining whether the user who sends the received message is authorized to access the identified data source, and if not, providing a message to the user that access is denied.

8. A computing system comprising:
at least one hardware processor; and
at least one memory carrying instructions that, when executed by the at least one hardware processor, cause the computing system to:
receive, at a graphical user interface (GUI) and from a user, a natural language plaintext message requesting one or more pieces of information;
analyze the plaintext message for multiple possible intents;
for each of the multiple intents, generate an intent score,
wherein each generated intent score indicates a likelihood that the received message corresponds to one of the multiple intents,
wherein the multiple intents include intents corresponding to at least two of: lawyer performance, law firm performance, law firm practice group performance, or law firm client information, and
wherein each generated score is based on comparing the received message to example utterances corresponding to each of the multiple intents;
if one or more generated scores exceeds a threshold score, determine an intent based on a highest generated score;
determine that the intent with the highest intent score is a compound intent;
wherein a compound intent is intent that corresponds to two or more pieces of information from two or more data sources;
divide the received message into two or more parts
wherein each of the two or more parts corresponds to a single intent of the compound intent;
extract, from each part of the received message, at least one data entity, wherein the at least one data entity includes one or more of an attorney name, a practice group name, a client name, an office name, a date, or a law firm financial metric;

identify, based on each determined intent, at least one data source from which to retrieve the requested one or more pieces of information,
 wherein the data source is identified based on the determined intent and the extracted at least one data entity;

retrieve from the identified data source, based on the determined intent and the at least one data entity, the requested one or more pieces of information;

analyze the one or more pieces of information about or maintained by the law firm for each part of the received message to determine a single combined output method for each part;

combine the one or more pieces of information about or maintained by the law firm for each part of the received message into a single output,
 wherein the single output includes each piece of information for each part of the received message, and
 wherein the output includes charts, graphs, recommendations, dashboards, or reports; and display, at the GUI, the single output of the at least two parts of the received message.

9. The computing system of claim 8, further caused to:
if none of the one or more generated scores exceed the threshold score, display, at the GUI, a message comprising an indication that no intent is determined and a suggestion of one or more alternative queries.

10. The computing system of claim 8, wherein the identified data source is a human resources database, an attorney timekeeping database, a financial database, or a billing database, and wherein the computing system is further caused to:
 based on a determined identity of the user, dynamically adapt a functional or aesthetic feature of the GUI for the user.

11. The computing system of claim 8, wherein the one or more pieces of information include a billing rate, an attorney performance metric, accounts payable information, accounts receivable information, or an invoice, wherein the computing system is further caused to:
 display, at the GUI, a set of selectable icons or buttons,
  wherein each icon or button in the set of selectable icons or buttons corresponds to a stored previously submitted message associated with the user, and
  wherein receiving a selection of an icon or button from the set of selectable icons or buttons causes the system to receive the stored previously submitted message corresponding to the selected icon or button; and
 receive a selection of an icon or button from the set of selectable icons or buttons.

12. The computing system of claim 8, further caused to:
display, at the GUI, a share button or icon; and
in response to receiving a selection, from the user, of the share button or icon, cause to be transmitted a message to another user,
 wherein the transmitted message includes the displayed one or more pieces of information.

13. The computing system of claim 8, wherein the intent is determined based on an artificial intelligence (AI) natural language processing model, further caused to:
receive an indication from the user that the determined intent is incorrect;
receive a selection of a corrected intent; and
store the received message as an example utterance corresponding to the corrected intent.

14. The computing system of claim 8, wherein displaying the one or more pieces of information further causes the computing system to:
 select, based at least in part on the determined intent, a customized tool from a set of customized tools, wherein each customized tool is configured to facilitate analysis of retrieved information; and
 display at least a portion of the one or more pieces of information using the selected customized tool from the set of customized tools.

* * * * *